United States Patent
Nakaya et al.

(10) Patent No.: US 8,602,492 B2
(45) Date of Patent: Dec. 10, 2013

(54) SEAT SYSTEM FOR VEHICLE

(75) Inventors: Kouichi Nakaya, Hiroshima (JP); Akihiro Kobayashi, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 566 days.

(21) Appl. No.: 12/905,260

(22) Filed: Oct. 15, 2010

(65) Prior Publication Data

US 2011/0109130 A1 May 12, 2011

(30) Foreign Application Priority Data

Nov. 12, 2009 (JP) ................................. 2009-259081

(51) Int. Cl.
*B60N 2/42* (2006.01)
(52) U.S. Cl.
USPC ................. 297/216.13; 297/216.12; 296/68.1
(58) Field of Classification Search
USPC ........... 297/216.13, 216.14, 216.12; 296/68.1
See application file for complete search history.

(56) References Cited

U.S. PATENT DOCUMENTS

| | | | | |
|---|---|---|---|---|
| 4,249,769 A | * | 2/1981 | Barecki | 296/68.1 |
| 4,512,604 A | * | 4/1985 | Maeda et al. | 296/68.1 |
| 5,378,043 A | * | 1/1995 | Viano et al. | 297/408 |
| 5,673,971 A | * | 10/1997 | Wieclawski | 297/378.11 |
| 5,884,968 A | * | 3/1999 | Massara | 297/216.12 |
| 5,938,279 A | * | 8/1999 | Schubring et al. | 297/216.12 |
| 6,199,947 B1 | * | 3/2001 | Wiklund | 297/216.12 |
| 6,523,892 B1 | * | 2/2003 | Kage et al. | 297/216.13 |
| 6,550,865 B2 | * | 4/2003 | Cho | 297/408 |
| 6,631,949 B2 | * | 10/2003 | Humer et al. | 297/216.12 |
| 6,631,955 B2 | * | 10/2003 | Humer et al. | 297/408 |
| 6,655,733 B2 | * | 12/2003 | Humer et al. | 297/216.12 |
| 6,719,368 B1 | * | 4/2004 | Neale | 297/216.14 |
| 6,783,177 B1 | * | 8/2004 | Nakano | 297/216.12 |
| 6,789,846 B2 | * | 9/2004 | Humer et al. | 297/216.12 |
| 7,077,472 B2 | * | 7/2006 | Steffens, Jr. | 297/216.13 |
| 7,097,242 B2 | * | 8/2006 | Farquhar et al. | 297/216.12 |
| 7,204,552 B2 | * | 4/2007 | Ishizuka | 297/216.12 |
| 7,374,239 B1 | * | 5/2008 | Jayasuriya et al. | 297/216.12 |
| 7,588,289 B2 | * | 9/2009 | Bostrom et al. | 297/216.12 |

(Continued)

FOREIGN PATENT DOCUMENTS

DE 101 13 091 A1 10/2002
DE 10 2005 043 084 A1 3/2007

(Continued)

OTHER PUBLICATIONS

The Extended European Search Report dated Jan. 13, 2011; Application No. 10014203.3-2424.

*Primary Examiner* — David E Allred
(74) *Attorney, Agent, or Firm* — Studebaker & Brackett PC

(57) ABSTRACT

A seat for a passenger comprises reinforcing structure bodies reinforcing seatbacks, connection support portions connecting the reinforcing structure bodies to a vehicle-body wall portion so as to support the reinforcing structure bodies at the vehicle-body wall portion, pressure-receiving portions provided in the seatbacks and supported so as to move rearwardly by being pressed by passengers in a vehicle rear collision, the pressure-receiving portions being arranged at a specified height position which is a distance upwardly away from lower end portions of the seatbacks, and headrest moving-mechanism portions moving headrests forwardly or upwardly in accordance with a rearward move of the pressure-receiving portions. Accordingly, a passenger's head portion can be protected effectively with a simple structure.

10 Claims, 10 Drawing Sheets

(56) References Cited

U.S. PATENT DOCUMENTS

| | | | |
|---|---|---|---|
| 7,597,391 B2* | 10/2009 | Jayasuriya et al. | 297/216.12 |
| 8,123,292 B2* | 2/2012 | Nishiura et al. | 297/216.12 |
| 8,132,857 B2* | 3/2012 | Omori et al. | 297/216.12 |
| 8,210,607 B2* | 7/2012 | Takayasu et al. | 297/216.12 |
| 8,240,757 B2* | 8/2012 | Niitsuma et al. | 297/216.12 |
| 8,307,734 B2* | 11/2012 | Shimizu et al. | 74/502.4 |
| 8,317,259 B2* | 11/2012 | Nakaya et al. | 297/61 |
| 8,356,860 B2* | 1/2013 | Nakaya et al. | 297/216.12 |
| 8,393,642 B2* | 3/2013 | Nakaya et al. | 280/751 |
| 2003/0001414 A1* | 1/2003 | Humer et al. | 297/216.12 |
| 2003/0011224 A1* | 1/2003 | Humer et al. | 297/216.12 |
| 2003/0015897 A1* | 1/2003 | Humer et al. | 297/216.12 |
| 2003/0067203 A1* | 4/2003 | Brewer et al. | 297/378.12 |
| 2004/0195872 A1* | 10/2004 | Svantesson | 297/216.12 |
| 2004/0245814 A1* | 12/2004 | Lee | 297/216.12 |
| 2006/0006709 A1* | 1/2006 | Uno et al. | 297/216.12 |
| 2006/0170258 A1* | 8/2006 | Ishizuka | 297/216.12 |
| 2006/0273636 A1* | 12/2006 | Sugimoto | 297/216.12 |
| 2007/0096514 A1* | 5/2007 | Haglund et al. | 297/216.12 |
| 2008/0088158 A1* | 4/2008 | Yokota et al. | 297/216.12 |
| 2008/0164731 A1* | 7/2008 | Bostrom et al. | 297/216.12 |
| 2008/0197681 A1* | 8/2008 | Jayasuriya et al. | 297/216.12 |
| 2008/0217971 A1* | 9/2008 | Paluch | 297/216.12 |
| 2008/0309131 A1* | 12/2008 | Yokota et al. | 297/216.12 |
| 2009/0039687 A1* | 2/2009 | Hinata et al. | 297/216.14 |
| 2009/0179468 A1* | 7/2009 | Orzelski et al. | 297/216.12 |
| 2009/0315371 A1* | 12/2009 | Shimizu et al. | 297/216.12 |
| 2009/0322126 A1* | 12/2009 | Nishiura et al. | 297/216.12 |
| 2010/0187875 A1* | 7/2010 | Sasaki et al. | 297/216.12 |
| 2011/0109132 A1* | 5/2011 | Nakaya et al. | 297/216.12 |
| 2012/0032480 A1* | 2/2012 | Orzelski | 297/216.12 |
| 2012/0126593 A1* | 5/2012 | Niitsuma et al. | 297/216.12 |
| 2012/0126594 A1* | 5/2012 | Niitsuma et al. | 297/216.12 |
| 2012/0133181 A1* | 5/2012 | Omori et al. | 297/216.12 |

FOREIGN PATENT DOCUMENTS

| | | |
|---|---|---|
| EP | 627340 A1 * | 12/1994 |
| FR | 2 733 945 A1 | 11/1996 |
| JP | 2001-071802 A | 3/2001 |
| JP | 2001-163097 A | 6/2001 |
| JP | 2008-273445 A | 11/2008 |

* cited by examiner

SEAT SYSTEM FOR VEHICLE

BACKGROUND OF THE INVENTION

The present invention relates to a seat system for a vehicle which is installed in a vehicle compartment of the vehicle.

Conventionally, vehicles, such as automotive vehicles, have been developed so that a headrest of a seat is controlled to move forwardly in a vehicle rear collision and thereby a passenger's head portion is supported effectively by restraining its rearward move, so that the passenger's head portion can be properly protected.

Japanese Patent Laid-Open Publication No. 2008-273445, for example, discloses a seat device, in which behind a seatback to support a passenger's back portion are arranged a rear parcel shelf and a rear parcel trim which covers the rear parcel shelf, a headrest support portion projects forwardly from a front face of the rear parcel trim, and a spring is provided between the rear parcel shelf and the seatback so that the seatback is supported at the rear parcel shelf via the spring. According to this seat device, in the vehicle rear collision, the headrest can be restrained from moving rearwardly by the headrest support portion contacting the headrest, whereas the seatback moves rearwardly, compressing the spring, and the headrest moves forwardly relatively to the seatback. Consequently, the amount of rearward move of the passenger's head portion relative to the passenger's back portion can be properly decreased.

However, the seat device disclosed in the above-described publication has a problem in that since a headrest reclining device is provided at a rear parcel, good appearances would be deteriorate, and a layout flexibility of the rear parcel or the headrest would be restricted.

SUMMARY OF THE INVENTION

The present invention has been devised in view of the above-described problem, and an object of the present invention is to provide a seat system for a vehicle which can protect the passenger's head portion effectively with a simple structure, without deteriorating good appearances.

According to the present invention, there is provided a seat system for a vehicle, comprising a seat for a passenger, the seat including a seatback to support a passenger's back portion and a headrest to support a passenger's head portion, a reinforcing structure body reinforcing the seatback of the seat, a connection support portion connecting the reinforcing structure body to a vehicle-body wall portion so as to support the reinforcing structure body at the vehicle-body wall portion, a pressure-receiving portion provided in the seatback of the seat and supported so as to move rearwardly by being pressed by the passenger in a vehicle rear collision, the pressure-receiving portion being arranged at a specified height position which is upwardly away from a lower end portion of the seatback, and a headrest moving-mechanism portion moving the headrest of the seat forwardly or upwardly in accordance with a rearward move of the pressure-receiving portion.

According to the present invention, the headrest moving mechanism and others can be arranged properly even at a vehicle which does not comprise the above-described rear parcel, for example, without deteriorating good appearances of the rear parcel or the headrest, and a design flexibility can be secured. Further, since the pressure-receiving portion is arranged at the specified height position which is upwardly away from the lower end portion of the seatback, the headrest moving-mechanism portion can be compact effectively by shortening the distance between the headrest and the pressure-receiving portion. Moreover, since the reinforcing structure body of the seatback is connected to the vehicle-body wall portion, a pressing load to be applied to the seatback from the passenger's back portion in the vehicle rear collision can be focused on the pressure-receiving portion and thereby the headrest can be moved forwardly or upwardly. Accordingly, the rearward move of the passenger's head portion can be restrained effectively with a simple structure.

According to an embodiment of the present invention, the seat system for a vehicle further comprises a first seat which includes a seatback and a headrest in addition to the above-described seat for a passenger, wherein the seatback of the first seat comprises a first reinforcing structure body reinforcing the seatback of the first seat, a first pressure-receiving portion supported so as to move rearwardly by being pressed by a passenger seated in the first seat in a vehicle rear collision, the first pressure-receiving portion being arranged at a specified height position which is upwardly away from a lower end portion of the seatback of the first seat, and a first headrest moving-mechanism portion moving the headrest of the first seat forwardly or upwardly in accordance with a rearward move of the first pressure-receiving portion, and a distance from the lower end portion of the seatback of the seat to the pressure-receiving portion of the seat is set to be greater than a distance from the lower end portion of the seatback of the first seat to the first pressure-receiving portion of the first seat. Thereby, by arranging the first pressure-receiving portion of the first seat near the lower end portion of the seatback, the first pressure-receiving portion can be moved relatively rearwardly in the vehicle rear collision, so that the headrest of the first seat can be securely moved forwardly or upwardly.

According to another embodiment of the present invention, a baggage room is formed in back of the seat for a passenger, and a bottom portion of the baggage room is provided so as to extend rearwardly from a position near the lower end portion of the seat. Thereby, by forming the lower end portion of the seatback in a thin (small thickness) shape, compared with a case in which the pressure-receiving portion is arranged near the lower end portion of the seatback, a storage space of the baggage room can be enlarged effectively.

According to another embodiment of the present invention, at the headrest moving-mechanism portion of the seat for a passenger is provided a connecting member which connects the pressure-receiving portion and the head rest of the seat, at the reinforcing structure body of the seat for a passenger is provided a swing support portion which swingably supports the connecting member, and the headrest of the seat moves forwardly or upwardly in accordance with a swing move of the connecting member around the swing support portion. Thereby, by making the connecting member swing around the swing support portion in accordance with the rearward move of the pressure-receiving portion in the vehicle rear collision, the headrest can be moved forwardly or upwardly effectively with a simple structure.

According to another embodiment of the present invention, the swing support portion is provided near the connection support portion. Thereby, since a load acting on the swing support portion can be transmitted to the vehicle-body wall portion by the connection support portion and supported, the support rigidity of the headrest moving-mechanism portion can be secured with a simple structure. Further, by making the above-described connecting member swing smoothly with the pressing force acting on the pressure-receiving portion, the headrest can be moved forwardly or upwardly securely with a simple structure.

According to another embodiment of the present invention, the reinforcing structure body of the seat for a passenger is comprised of a seatback frame which extends along an outer periphery of the seatback, and configured so that a lower portion thereof has a width which is narrower than that of an upper portion thereof in an elevation view, and the headrest moving-mechanism portion of the seat for a passenger is arranged inside the reinforcing structure body. Thereby, any interference of the seatback with a protruding portion which is formed at the vehicle-body wall portion can be prevented, and also the sufficient width of the pressure-receiving portion can be secured, so that the headrest moving-mechanism portion can be properly driven.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Embodiment 1

Figure 1:
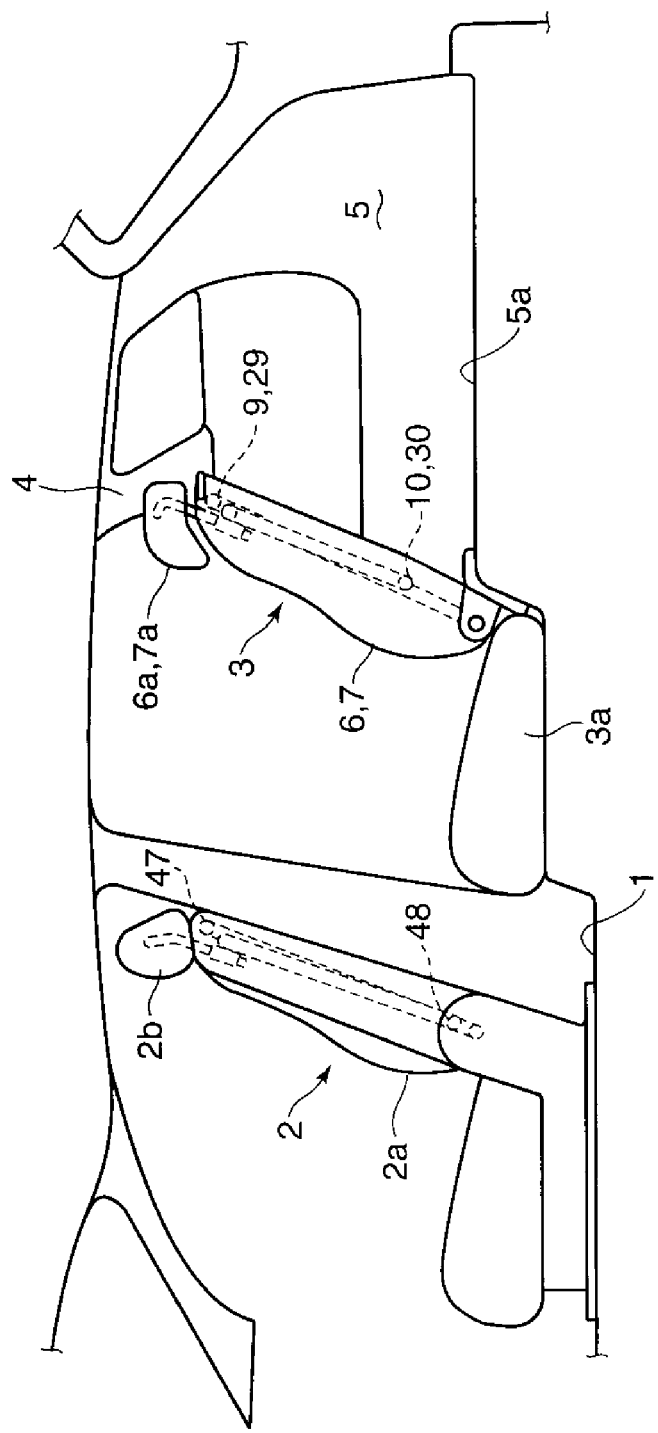
FIG. 1 is a side view showing a schematic structure of a vehicle equipped with a seat system for a vehicle according to a first embodiment of the present invention.
Figure 2:
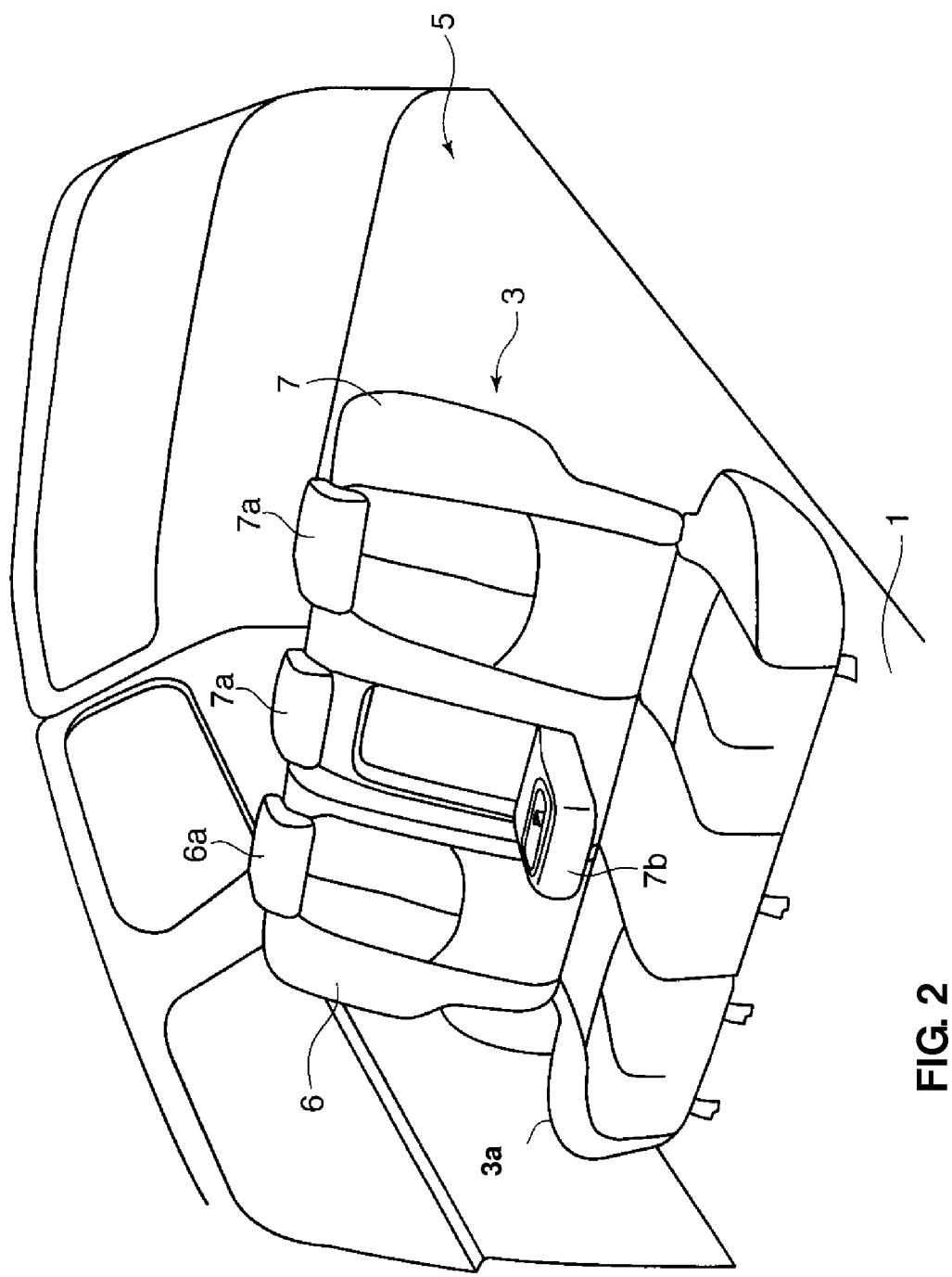
FIG. 2 is a perspective view showing an interior structure of the vehicle.

FIGS. 1 and 2 show an interior structure of a vehicle equipped with a seat system for a vehicle according to a first embodiment of the present invention. A front-row first seat 2, which comprises a driver's seat and an assistant's seat, is provided on a floor panel 1 which forms a bottom portion of a vehicle compartment of the vehicle. Behind the first seat 2 is arranged a rear-row seat for a passenger 3 which constitutes the seat system for a vehicle of the present invention. A vehicle-body wall portion 4 (side wall) which is comprised of a side panel of the vehicle is provided on an outward side of the seat for a passenger 3. A baggage room 5 is formed in back of the seat for a passenger 3, and its bottom portion 5a is provided so as to extend rearwardly from a specified position near a lower end portion of a seatback of the seat for a passenger 3.

Figure 3:
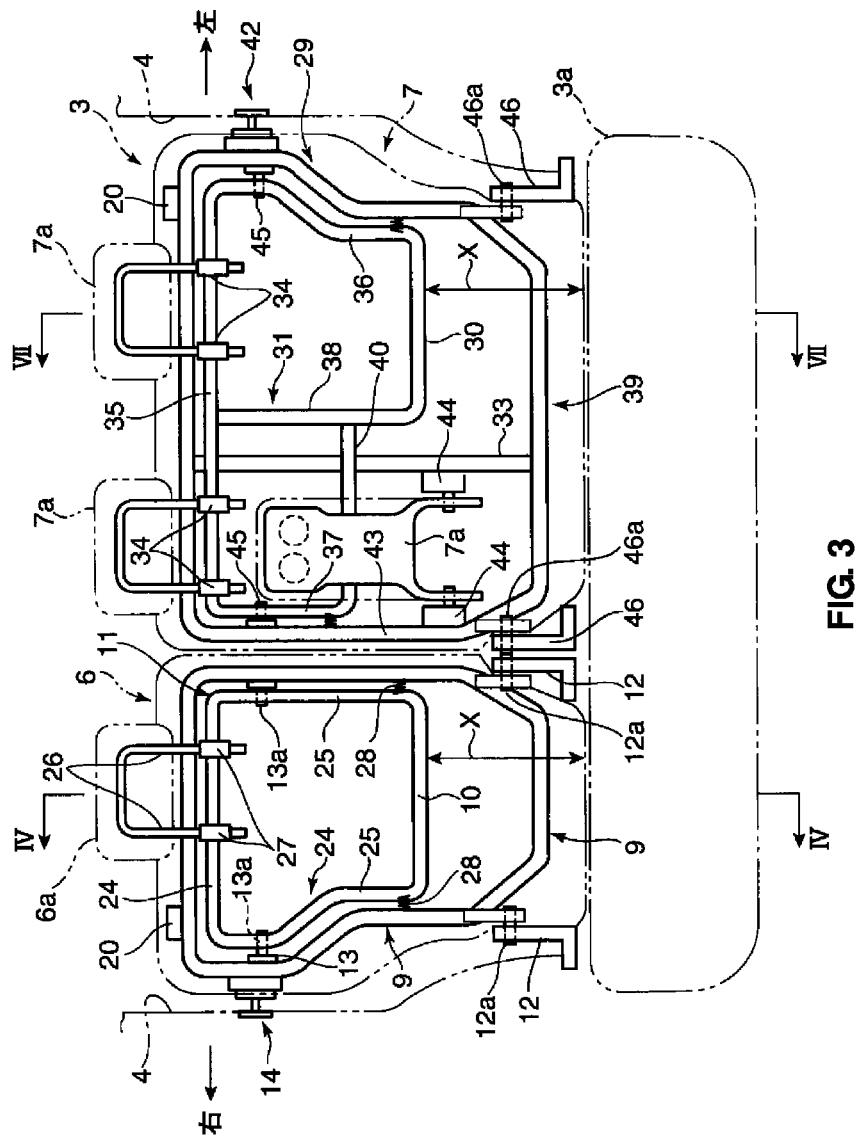
FIG. 3 is an elevation view showing an interior structure of the seat for a passenger.

The above-described rear-row seat for a passenger 3 is a bench seat, which comprises a common seat cushion 3a for plural passengers, a seatback for a single passenger 6, and a seatback for two passengers 7 as shown in FIG. 3. The seatback for a single passenger 6 has its width which corresponds to a single passenger, and a headrest 6a at its upper end portion. Inside the seatback for a single passenger 6 are arranged a reinforcing structure body 9 which reinforces this seatback 6, a back-face plate (not illustrated) which is provided behind the reinforcing structure body 9 and extends along a back face of the seatback 6, a pressure-receiving portion 10 which is provided so as to move rearwardly by being pressed by a passenger in a vehicle rear collision, which will be described later, and a headrest moving-mechanism portion 11 which moves the headrest 6a forwardly or upwardly in accordance with a rearward move of the pressure-receiving portion 10.

The above-described reinforcing structure body 9 is made of a circular-pipe made seatback frame which bends in a circular shape or a reverse-U shape so as to extend along an outer periphery of the seatback 6, in its elevation view. Its lower portion has a width which is narrower than that of its upper portion in its elevation view. For example, in a vehicle in which a protruding portion is formed at a lower portion of the vehicle-body wall portion 4 so as to correspond to a tire house or the like, part of an outside lower portion of the seatback 6 is concaved toward the center of the vehicle body in order to avoid any interference with the protruding portion, and the reinforcing structure body 9 is also formed in such a manner that it's shape shrinks downwardly in order to correspond to a shape of the seatback 6. Consequently, the lower portion of the reinforcing structure body 9 has its width which is narrower than that of its upper portion in its elevation view.

Further, the reinforcing structure body 9 is fixed to the floor panel 1 via a pair of seat brackets 12, 12 which is provided at its lower end portion, and supported so as to swing around support axes 12a of the seat brackets 12. The seatback 6 of the seat for a passenger 3 is supported so as to have a standing state or a folding state in accordance with the swing move of the reinforcing structure body 9, and held at respective positions in its standing and folding states by a lock mechanism, not illustrated, which is provided at the seat bracket 12.

Figure 5:
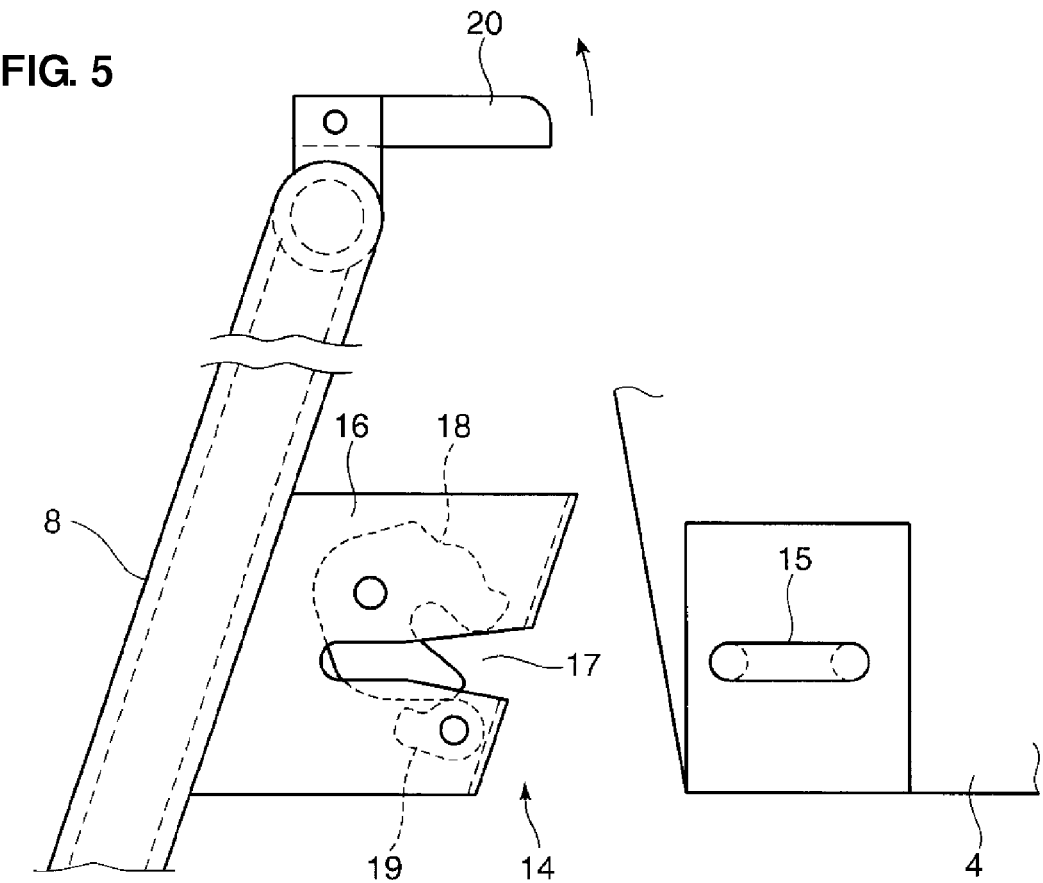
FIG. 5 is an explanatory view showing a detachment state of a connection support portion.

A connection support portion 14 which connects the reinforcing structure body 9 to the vehicle-body wall portion 4 so as to support the reinforcing structure body 9 at the vehicle-body wall portion 4 is provided at an upper position of the seatback 6 on the outward side. This connection support portion 14 comprises, as shown in FIG. 5, a striker 15 which is attached to the vehicle-body wall portion 4 and made of a U-shaped member, and a lock bracket 16 which is attached to the reinforcing structure body 9. The lock bracket 16 comprises a slot 17 to receive the striker 15, a latch 18 to hold the striker 15 into the slot 17, and a lock portion 19 to lock the latch 18 at a holding position of the striker 15.

Figure 6:
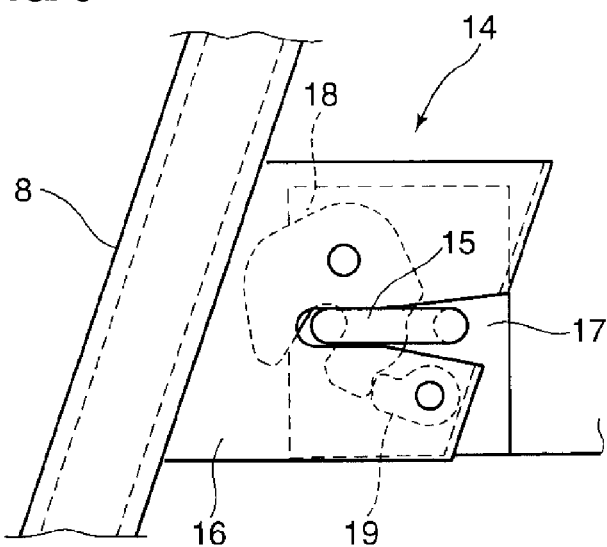
FIG. 6 is an explanatory view showing a connection state of the connection support portion.

For example, in case the seatback 6 moves from the folding state to the standing state, when the slot 17 of the lock bracket 16 which is formed at the seatback 6 is slid around the striker 15 on the vehicle-body side, as shown in FIG. 6, the latch 18 is pushed by the striker 15 so as to move to its holding state, and the latch 18 is held by the lock portion 19 at its holding state. Thus, the striker 15 is held in the slot 17 of the lock bracket 16, so that the above-described reinforcing structure body 9 is connected to and supported at the vehicle-body wall portion 4 via the connection support portion 14 which comprises the striker 15, the lock bracket 16 and so on. Accordingly, the seatback 6 is held at the standing state.

Meanwhile, in case the seatback 6 moves from the standing state to the folding state, when a lock releasing lever 20 which is provided at an upper end portion of the reinforcing structure body 9 is operated, the lock portion 19 is driven to a lock releasing position of the latch 18 via a cable, not illustrated. Thus, the support state of the reinforcing structure body 9 by the connection support portion 14 is released, so that the striker 15 can be withdrawn out of the slot 17 of the lock bracket 16 and the seatback 6 in the standing state can be rotated forwardly to the folding state.

The above-described headrest moving-mechanism portion 11 comprises a connection member 22 which is made of a circular pipe or the like which is arranged inside the reinforcing structure body 9. The connecting member 22 comprises an upper member 24 which extends in a vehicle width direction along a lower face of the upper portion of the reinforcing structure body 9 and a pair of side members 25 which extend downwardly from both-side end portions of the upper member 24. The side members 25 are supported at a pair of swing pivot portions 13, 13 which is formed at the reinforcing structure body 9 so as to swing. In the present embodiment, the above-described pressure-receiving portion 10 is formed integrally by bending the circular pipe of the connecting member 22. The pressure-receiving portion 10 is arranged at a specified height position which is a distance X upwardly away from the lower end portion of the seatback 6 so as to interconnect respective lower end portions of the side members 25.

A support bar 26 of the headrest 6a is inserted into a holding cylinder 27 which is provided at the upper member 24 of the connecting member 22 and fixed, so that the headrest 6a and the above-described pressure-receiving portion 10 are connected via the connecting member 22. Further, a pair of biasing members 28, which is made of a tension coil spring, is arranged between the lower end portion of the side member 25 and the side portion of the reinforcing structure body 9, so that the connecting member 22 is biased by the biasing members 28 so as to be held at its position along the reinforcing structure body 9.

Figure 4:
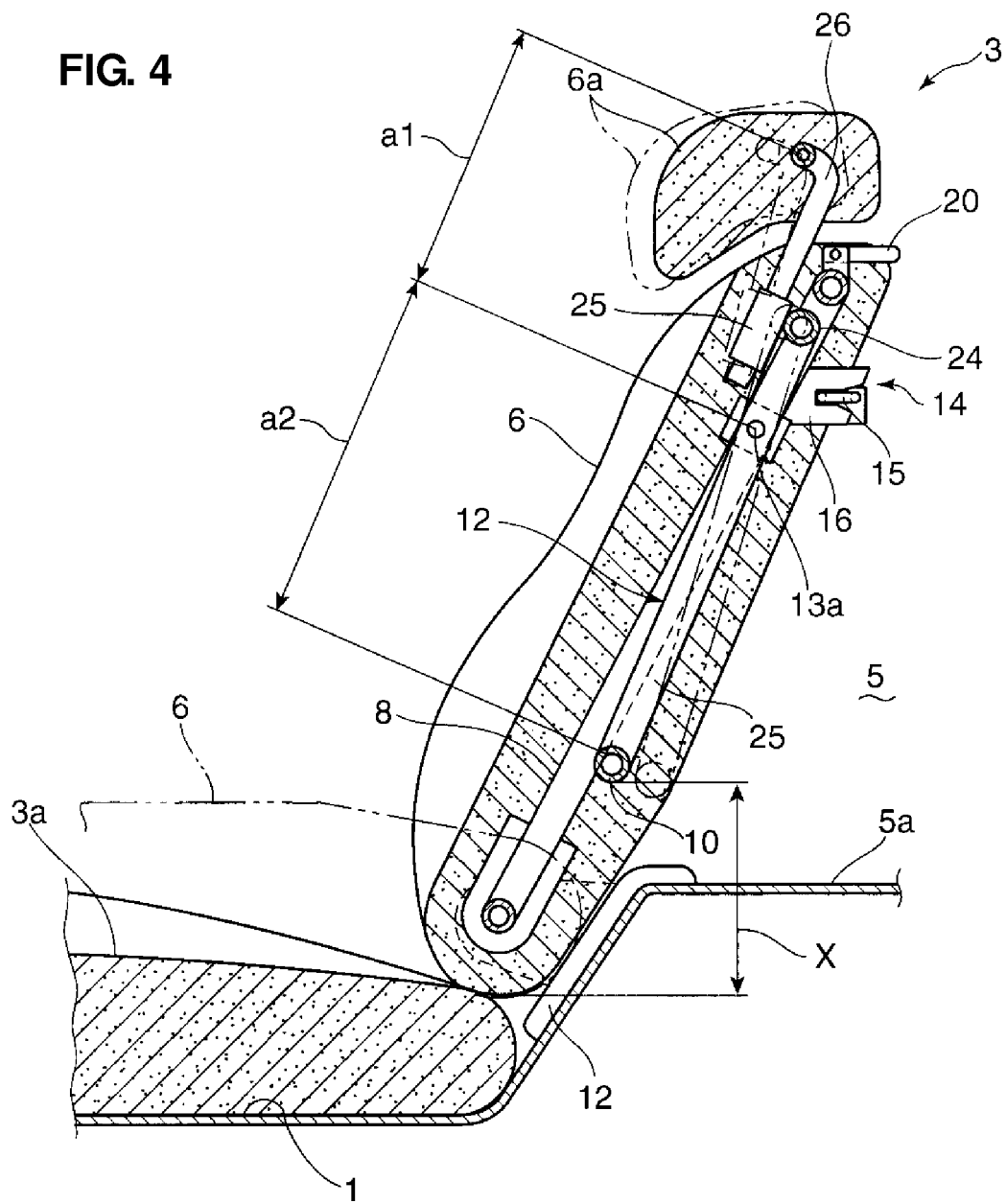
FIG. 4 is a sectional view taken along line IV-IV of FIG. 3.

The swing pivot portion 13 has a support axis 13a which projects inwardly from a side portion of the reinforcing structure body 9 at a specified position which is substantially the same height position as the connection support portion 14 on the upper right side of the seatback 6. The swing pivot portion 13 swingably supports the connecting member 22 of the headrest moving-mechanism portion 11 at the support axis 13a. When the pressure-receiving portion 10 is pressed rearwardly by the back portion of the passenger seated on the side of the seatback for a single passenger 6 in the vehicle rear collision, as shown by two-dotted broken lines in FIG. 4, the connecting member 22 of the headrest moving-mechanism portion 11 and the support bar 26 of the headrest 6a swing around the swing pivot portion 13, so that the headrest 6a moves obliquely upwardly and forwardly.

Figure 7:
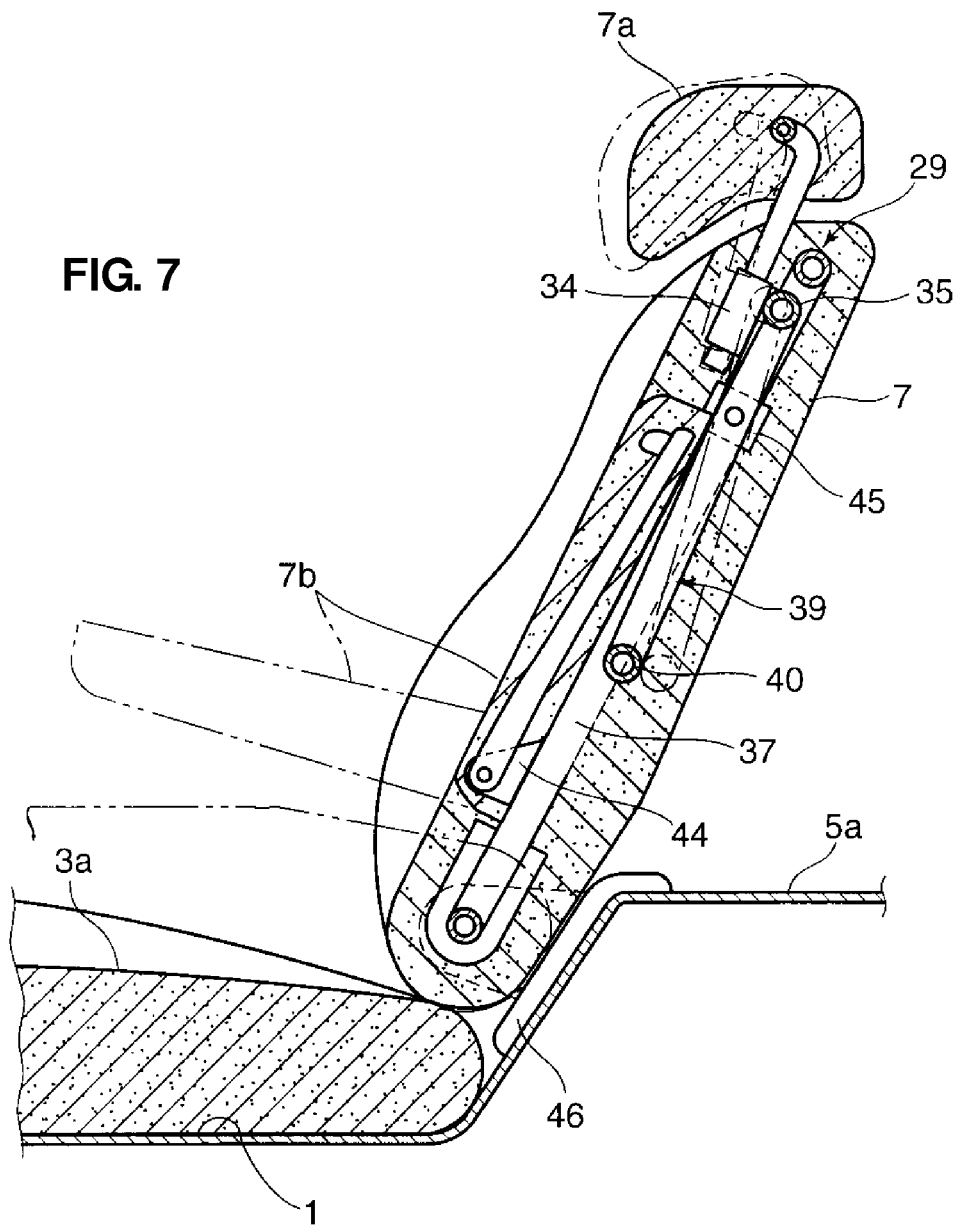
FIG. 7 is a sectional view taken along line VI-VI of FIG. 3.
Figure 8:
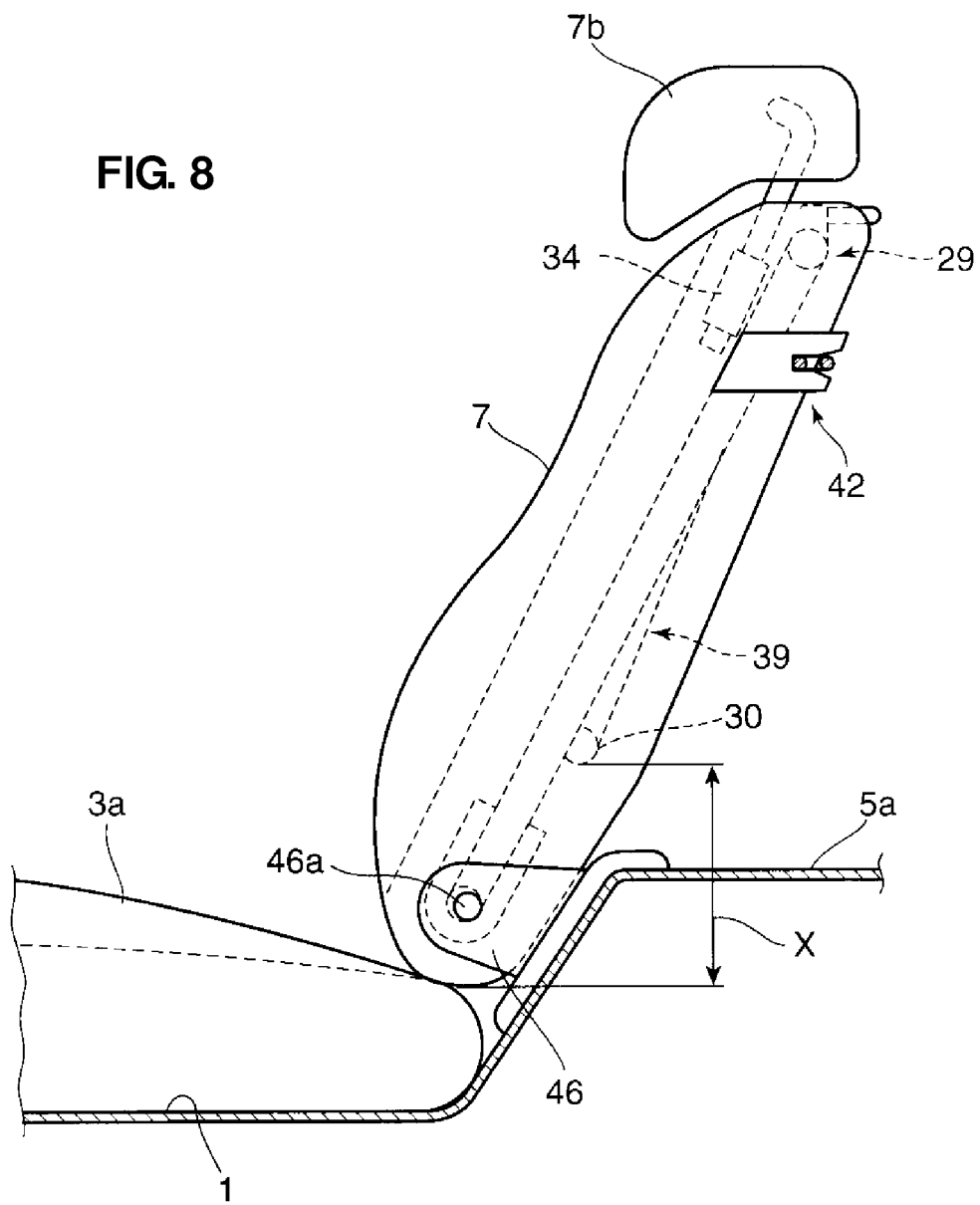
FIG. 8 is a side view of the seat for a passenger.

As shown in FIGS. 3, 7 and 8, the seatback for two passengers 7, which is wide enough for two passengers, is equipped with a pair of headrests 7a, 7a at its upper end portion and an armrest 7b at its front face. The armrest 7b is pivotally supported on the right side of the seatback 7, i.e., at the central portion of the vehicle in the vehicle width direction so that it can take its horizontal use position or its storage position located along the front face of the seatback 7.

Inside the seatback for two passengers 7 are arranged a reinforcing structure body 29 which reinforces this seatback 7, a back-face plate (not illustrated) which is provided behind the reinforcing structure body 29 and extends along a back face of the seatback 7, a pressure-receiving portion 30 which is provided so as to move rearwardly by being pressed by the passenger in the vehicle rear collision, and a headrest moving-mechanism portion 31 which moves the headrest 7a forwardly or upwardly in accordance with a rearward move of the pressure-receiving portion 30.

The reinforcing structure body 29 arranged inside the seatback for two passengers 7 is configured to be wider than the reinforcing structure body 9 arranged inside the seatback for a single passenger 6. Further, the reinforcing structure body 29 comprises a middle frame 33 which extends vertically along a disposition portion of the armrest 7b. Other structures of this reinforcing structure body 29 are substantially the same as those of the reinforcing structure body 9 arranged inside the seatback for a single passenger 6.

The headrest moving-mechanism portion 31 arranged inside the reinforcing structure body 29 has a connecting member 39, which comprises an upper member 35 which is equipped with a holding cylinder 34 for a headrest, a left-side vertical member 36 and a right-side vertical member 37 which extend downwardly from both-side end portions of the upper member 35, and a middle vertical member 38 which extends downwardly from a middle portion, in the vehicle width direction, of the upper ember 35. The right-side vertical member 37 positioned on the side of the setback for a single passenger 6 is configured so that its vertical length is smaller than that of the left-side vertical member 36 and the middle vertical member 38. A lower end portion of the right-side vertical member 37 is connected to a middle portion, in the vertical direction, of the middle vertical member 38 via a horizontal member 40.

The pressure-receiving portion 30, which is pressed rearwardly by the passenger's back portion in the vehicle rear collision, is arranged at a specified height position which is a distance X upwardly away from the lower end portion of the seatback 7 so as to interconnect respective lower end portions of the left-side vertical member 36 and the middle vertical member 38. Further, at an upper and left (outward) side position of the seatback 7 is provided a connection support portion 42, which has a similar structure to the connection support portion 14 provided at the seatback for a single passenger 6, i.e., a support mechanism which is comprised of a striker, a lock bracket and so on, so as to detachably connect the reinforcing structure body 29 to the vehicle-body wall portion 4.

A pair of armrest support portions 44 to support a base end portion of the armrest 7b is provided at respective lower portions of a vertical frame 43 which is positioned on the right side (on the side of the seatback for a single passenger 6) and constitutes the reinforcing structure body 29 and the above-described middle frame 33. The armrest support portions 44 are arranged below the horizontal member 44 which connects the right-side vertical member 37 and the middle member 38. The armrest 7b is configured to swing around support axes of the armrest support portions 44. According to the above-described structure in which the horizontal member 40 of the headrest moving-mechanism portion 31 is arranged above the armrest support portions 44 and no pressure-receiving portion of the headrest moving-mechanism portion 31 is provided near the base end portions of the armrest 7b, the connecting member 39 and the pressure-receiving portion 30 of the headrest moving-mechanism portion 31 can swing, without interfering with the armrest support portions 44.

At the reinforcing structure body 29 provided at the seatback for two passengers 7 is provided, like the reinforcing structure body 9 provided at the seatback for a single passenger 6, a pair of swing pivot portion 45, 45 which swingably supports the connecting member 39 of the headrest moving-mechanism portion 31 at a specified position which is substantially the same height position as the connection support portion 42 on the upper left side of the seatback 7. Moreover, the reinforcing structure body 29 is connected to the floor panel 1 via a pair of seat brackets 46, 46 which is provided at a lower end portion of the reinforcing structure body 29, and supported so as to swing around support axes 46a, 46a of the seat brackets 46, 46.

Figure 9:
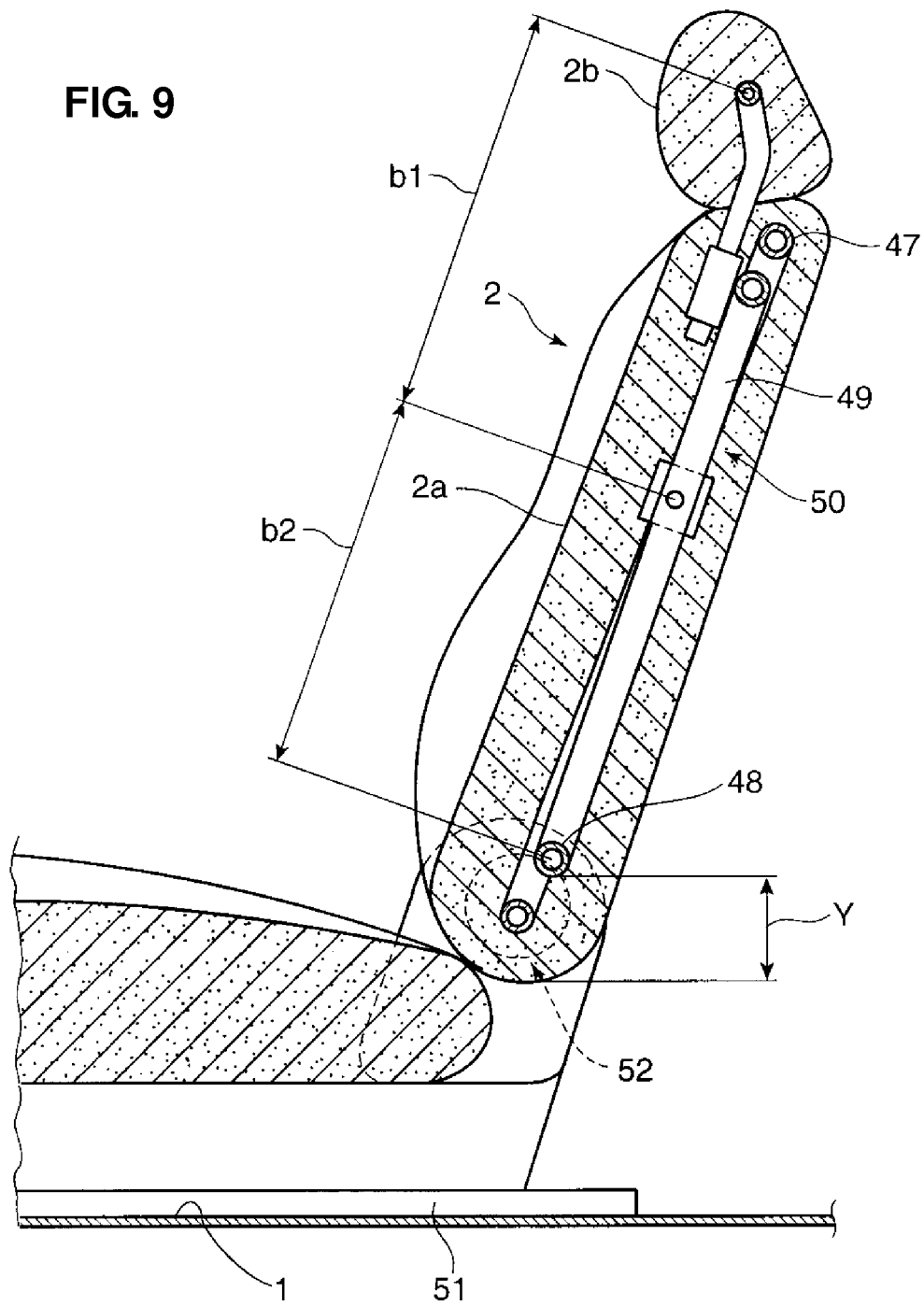
FIG. 9 is a sectional view of a first seat.

Meanwhile, at the first seat 1 which is arranged in front of the seat for a passenger 3 and comprises the driver's seat and the assistant's seat are provided, as shown in FIG. 9, a first headrest moving-mechanism portion 50 which comprises a first reinforcing structure body 47 which reinforces its seatback 2a, a first pressure-receiving portion 48 which is supported so as to move rearwardly by being pressed by a passenger in the vehicle rear collision, and a first connecting member 49 which swings so as to move a headrest 2b of the first seat 2 forwardly or upwardly in accordance with a rearward move of the first pressure-receiving portion 48.

Herein, distances a1, a2, b1, b2 (a1 is the distance from the swing center of the headrest moving-mechanism portion 11 to an upper portion of the headrest support bar 26 at the seat for a passenger 3; a2 is the distance from the swing center of the headrest moving-mechanism portion 11 to the pressure-receiving portion 10 at the seat for a passenger 3; b1 is the distance from the swing center of the headrest moving-mechanism portion 50 and an upper portion of the headrest support bar 26 at the first seat 2; and b2 is the distance from the swing center of the headrest moving-mechanism portion 50 to the pressure-receiving portion 48 at the first seat 2) are set so that a ratio of a1 to a2 is substantially equal to a ratio of b1 to b2. That is, by setting $a1/a2=b1/b2$, the swing center of the rear-row seat 3 can be positioned near the connection support portion 14 in the vertical direction.

Further, the first pressure-receiving portion 48 of the seatback 2a of the first seat 2 is arranged along a lower side portion of the first reinforcing structure body 47, so that a distance Y from the lower end portion of the seatback 2a to the first pressure-receiving portion 48 is set to be smaller than the above-described distance X from the lower end portions of the seatbacks 6, 7 to the pressure-receiving portions 10, 30. Further, the first seat 2 is supported so as to move longitudinally along a seat rail 51 which is disposed on the floor panel 1, so that any connection support portion which connects the first reinforcing structure body 47 at the seatback 2a of the first seat 2 to the vehicle-body wall portion 4 is not provided (that is, the first reinforcing structure body 47 is disconnected from the vehicle-body wall portion 4 so as not to be supported at the vehicle-body wall portion 4). Thus, the first seat 2 is different from the above-described seat for a passenger 3 in providing no connection support portion.

According to the seatback 2a of the first seat 2 in which no connection support portion which connects the first reinforcing structure body 47 to the vehicle-body wall portion 4 is provided as described above, the seatback 2a swings around a reclining mechanism 52 as a hinge portion which is connected to the seat cushion in accordance with a load acting in the vehicle rear collision, so that its upper portion may move rearwardly easily. Therefore, if the first pressure-receiving portion 48 is arranged above the lower end portion of the seatback 2a, it may be difficult to move the first pressure-receiving portion 48 relatively rearwardly in the vehicle rear collision. Accordingly, by setting the distance Y from the lower end portion of the seatback 2a to the first pressure-receiving portion 48 of the first seat 2 to be smaller than the distance X from the lower end portions of the seatbacks 6, 7 to the pressure-receiving portions 10, 30 of the seat for a passenger 3, while the first headrest moving-mechanism portion 50 may become large-sized, the first pressure-receiving portion 48 can be securely moved rearwardly in the vehicle rear collision.

That is, in case the first pressure-receiving portion 48 is arranged near the lower end portion of the seatback 2a, the pressing force acting in the vehicle rear collision can be focused on the first pressure-receiving portion 48 more, compared with a case in which the first pressure-receiving portion 48 is arranged above the lower end portion of the seatback 2a. Accordingly, the first pressure-receiving portion 48 is arranged near the lower end portion of the seatback 2a as described above so that the first pressure-receiving portion 48 can be effectively moved relatively rearwardly, and thereby the first connecting member 49 swings smoothly so that the headrest 2a can be securely moved forwardly or upwardly.

Meanwhile, as described above, the seat for a passenger 3, which is arranged behind the first seat 2 and equipped with the seatbacks 6, 7 to support the passenger's back portion and the headrests 6a, 7a to support the passenger's head portion, comprises the reinforcing structure bodies 9, 29 which reinforce the seatbacks 6, 7 of the seat 3, the connection support portions 14, 42 which connect the reinforcing structure bodies 9, 29 to the vehicle-body wall portion 4 so as to support the reinforcing structure bodies 9, 29 at the vehicle-body wall portion 4, the pressure-receiving portions 10, 30 which are provided in the seatbacks 6, 7 and supported so as to move rearwardly by being pressed by the passenger in the vehicle rear collision, the pressure-receiving portions 10, 30 being arranged at the specified height position which is the distance X upwardly away from the lower end portions of the seatbacks 6, 7, and the headrest moving-mechanism portions 11, 31 which move the headrests 6a, 7a forwardly or upwardly in accordance with the rearward move of the pressure-receiving portions 10, 30. Accordingly, the passenger's head portion can be protected effectively with the simple structure.

That is, both the upper portion and the lower portion of the reinforcing structure body 9 can be supported stably by the connection support portion 14 which is provided on the upper right side and has the above-described striker 15 and lock bracket 16 and the seat bracket 12 which supports the lower end portion of the seatback 6 at the seatback for a single passenger 6 of the seat for a passenger 3. Accordingly, even if the passenger's back portion is pressed against the seatback 6 in the vehicle rear collision, the body portion of the seatback 6 can be effectively restrained from moving rearwardly.

Thus, even in case the pressure-receiving portion 10 is arranged the distance X above the lower end portion of the seatback 6, the upper portion of the reinforcing structure body 9 of the seatback 6 is connected to the vehicle-body wall portion 4, so that the seatback 6 can move rearwardly very little in the vehicle rear collision and thereby the pressing force acting on the seatback 6 can be focused on the pressure-receiving portion 10. Accordingly, the pressure-receiving portion 10 can be moved rearwardly effectively, so that the connecting member 22 of the headrest moving-mechanism portion 11 swings so that the headrest 6a can be securely moved forwardly or upwardly. Consequently, the passenger's head portion can be held stably. Further, since the pressure-receiving portion 10 is arranged the distance X above the lower end portion of the seatback 6 as described above, the headrest moving-mechanism portion 11 can be compact effectively by shortening the vertical length of the connecting member 22 which connects the headrest 6a and the pressure-receiving portion 10.

While the seatback for two passengers 7 of the seat 3 may obtain the above-described advantages, in case the armrest 7b is pivotally supported at the seatback for two passengers 7, it may be difficult to provide a pressure-receiving portion to swing the above-described connecting member 39 at the disposition portion of the armrest 7b. Therefore, in the above-described embodiment, the pressure-receiving portion 30 only at a specified portion excluding the disposition portion of the armrest 7b, i.e., at the left-side (outward) position of the seatback 7, so that the connecting member 39 can swing in accordance with the rearward pressing of the pressure-receiving portion 30 by the back portion of the passenger seated in left-side part of the seat for a passenger 3. Thereby, the right and left headrests 7a, 7a are moved forwardly or upwardly concurrently.

In case the baggage room 5 is formed in back of the seat for a passenger 3, and its bottom portion 5a is provided so as to extend rearwardly from the position near the lower end portion of the seatback as shown in the above-described embodiment, the sufficient storage space of the baggage room 5 can be secured. That is, since the pressure-receiving portions 10, 30 are arranged at the height position which is the distance X upwardly away from the lower ends of the seatback for a single passenger 6 and the seatback for two passengers 7, the lower end portions of the seatbacks 6, 7 are formed in a thin (small thickness) shape, compared with a case in which the pressure-receiving portions are arranged near the lower end portions of the seatbacks 6, 7, so that the storage space of the baggage room 5 can be enlarged effectively. Further, when the seatbacks 6, 7 are in the folding state shown by the two-dotted broken lines in FIG. 4, a face on which some article is placed can be formed continuously by their upper faces and the bottom portion 5a of the baggage room 5.

Further, according to the above-described embodiment, at the headrest moving-mechanism portions 11, 31 of the seat for a passenger 3 are provided the connecting members 22, 39 which connect the pressure-receiving portions 10, 30 and the headrests 6a, 7a, at the reinforcing structure bodies 9, 29 of the seat for a passenger 3 are provided the swing support portions 13, 45 which swingably support the connecting members 22, 39, and the headrests 6a, 7a move forwardly or upwardly in accordance with the swing move of the connecting members 22, 39 around the swing support portions 13, 45. Thereby, the headrests 6a, 7a can be securely moved forwardly or upwardly with a simple structure in the vehicle rear collision. Accordingly, the passenger's head portion can be held effectively.

Specifically, in case the swing support portions 13, 45 are provided near the connection support portions 14, 42 which connect the reinforcing structure bodies 9, 29 of the seat 3 to the vehicle-body wall portion 4 as shown in the above-described embodiment, the load acting on the swing support portions 13, 45 can be transmitted to the vehicle-body wall portion 4 by the connection support portions 14, 42 and supported. Accordingly, the support rigidity of the headrest moving-mechanism portions 11, 31 can be secured with the simple structure, and the connecting members 22, 39 can be made swing smoothly in accordance with the pressing force acting on the pressure-receiving portions 10, 30. In this case, by positioning the pressure-receiving portions 10, 30 upwardly, the swing support portions 13, 45 of the headrest moving-mechanism portions 11, 31 is arranged at an upper position from a requirement of movable amount of the headrests 6a, 7a in the vehicle rear collision, so that the swing support portions 13, 45 can be closer to the connection support portions 14, 42. Accordingly, the support rigidity of the headrest moving-mechanism portions 11, 31 can be increased effectively.

Further, according to the above-described embodiment, the reinforcing structure bodies 9, 29 are comprised of the seatback frames which extend along outer peripheries of the seatbacks 6, 7, and configured so that their lower portions have the widths which are narrower than those of their upper portions in the elevation view, and the headrest moving-mechanism portions 11, 31 are arranged inside the reinforcing structure bodies 9, 29. Thereby, the sufficient widths of the pressure-receiving portions 10, 30 can be secured, so that the headrest moving-mechanism portions 11, 31 can be properly driven.

That is, in the vehicle in which part of the outside lower portions of the seatbacks 6, 7 are concaved toward the center of the vehicle body in order to avoid any interference with the protruding portion which is formed at the vehicle-body wall portion 4, and the reinforcing structure bodies 9, 29 are also formed in such a manner that their shapes shrink downwardly in order to correspond to the shape of the seatback 6, in case the pressure-receiving portions 10, 30 are arranged near the lower end portions of the seatbacks 6, 7, the sufficient widths of the pressure-receiving portions 10, 30 cannot be secured. However, in case the pressure-receiving portions 10, 30 are arranged above the lower end portions of the seatbacks 6, 7 as described above, the sufficient widths of the pressure-receiving portions 10, 30 can be secured. Accordingly, the back portions of the passengers seated in the seat for a passenger 3 can be securely made contract the respective pressure-receiving portions 10, 30 in the vehicle rear collision, so that the headrest moving-mechanism portions 11, 31 can be properly driven.

Herein, while the above-described reinforcing structure bodies 9, 29 are made of the pipe made seatback frames which bend so as to extend along the outer peripheries of the seatbacks 6, 7 in the above-described embodiment, the reinforcing structure bodies to reinforce the seatbacks 6, 7 may be constituted by arranging plate members which have substantially the same shapes as those of the seatbacks 6, 7 in the elevation view, and the above-described swing support portions 13, 45 and the connection support portions 14, 42 may be arranged by using bead-shaped reinforcing portions or the like which are provided at these reinforcing structure bodies. In this case, the pressure-receiving portions and the headrest moving-mechanism portions may be provided in front of the above-described plate members.

Embodiment 2

Figure 10:
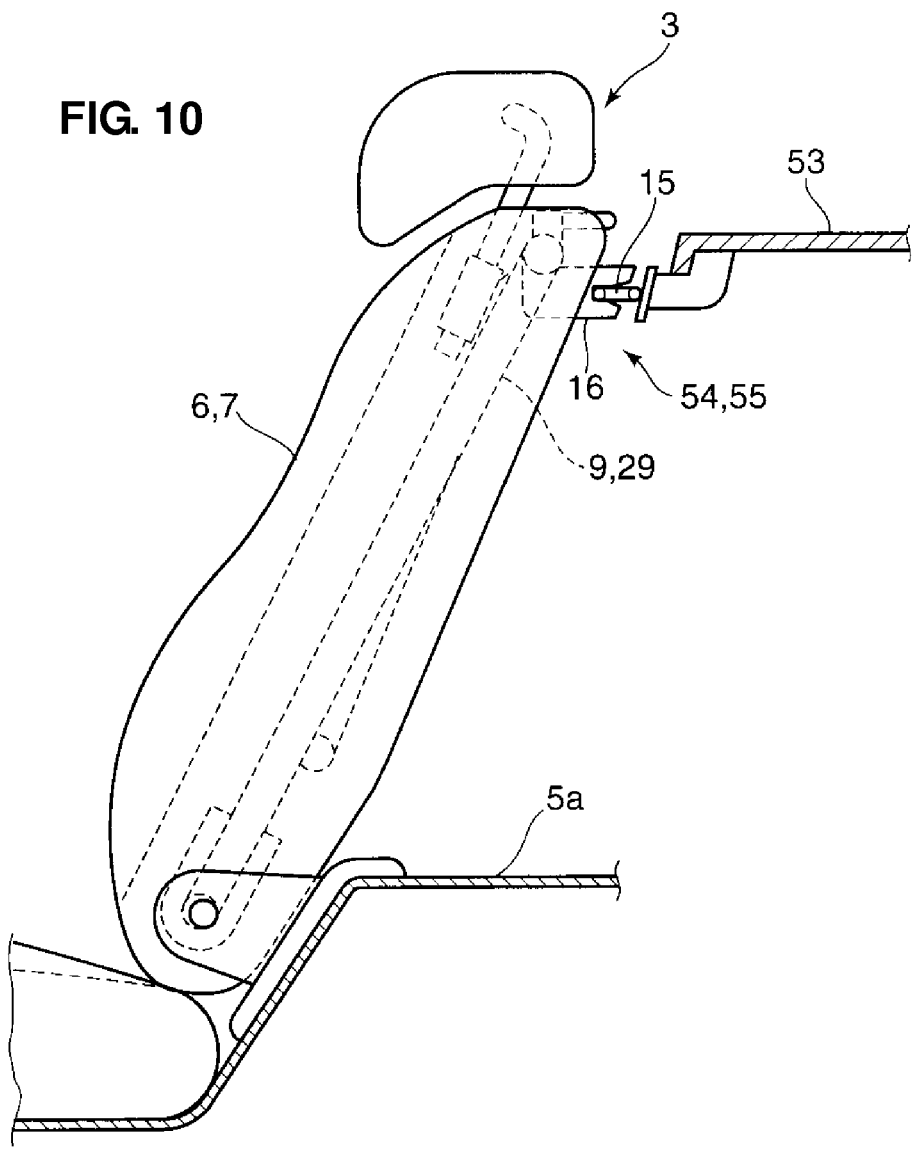
FIG. 10 is a side view of a seat for a passenger according to a second embodiment of the present invention, which corresponds to FIG. 8.
Figure 11:
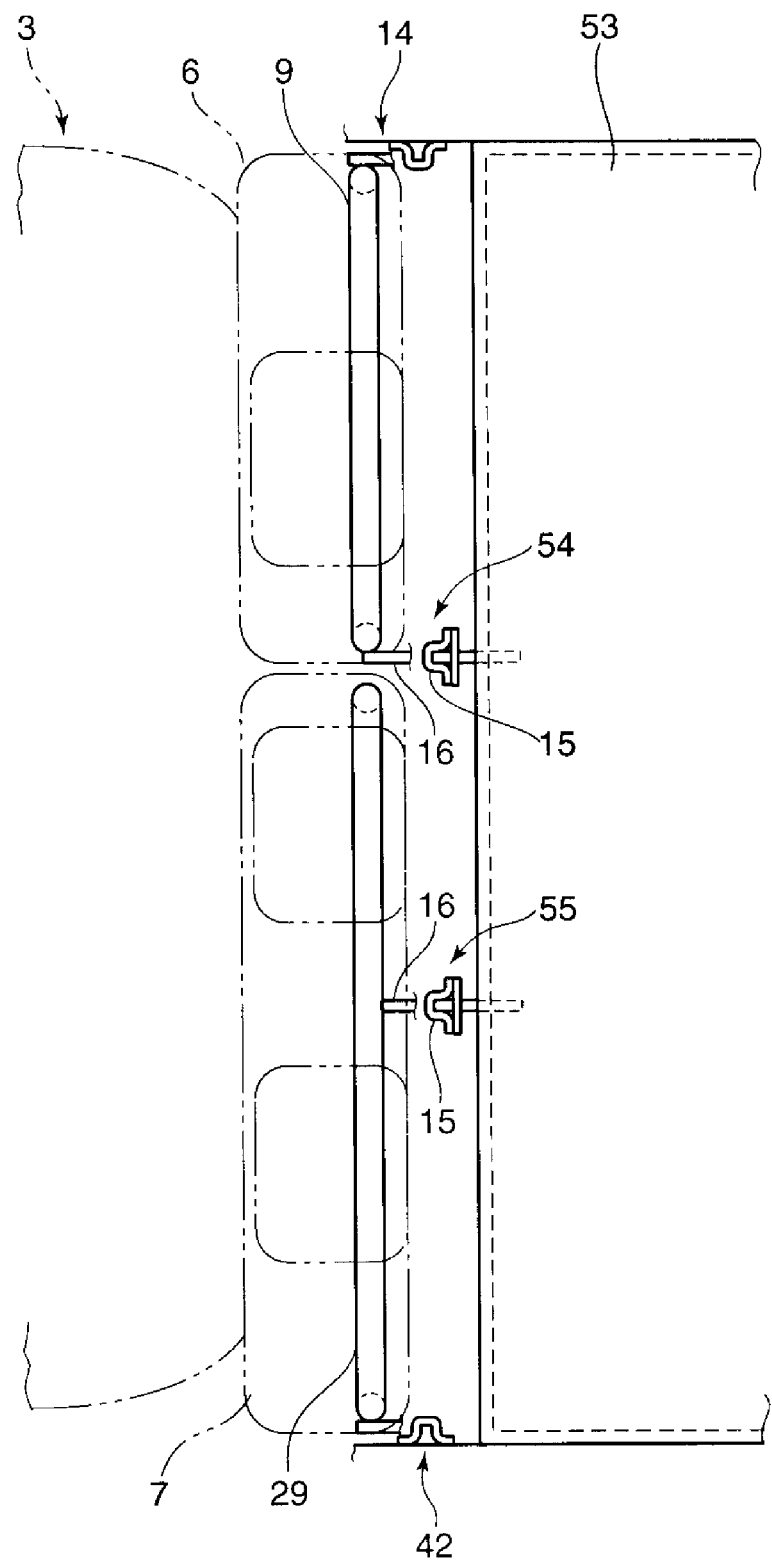
FIG. 11 is a plan view of the seat for a passenger according to the second embodiment of the present invention.

In place of the above-described first embodiment in which the reinforcing structure bodies 9, 29 of the seat for a passenger 3 are connected to and supported at the vehicle-body wall portion 4 which is made of the side panel of the vehicle via the connection support portions 14, 42, a second embodiment shown in FIGS. 10 and 11 may be applied. In the second embodiment, in a vehicle, such as a sedan type of vehicle, in which a package tray 53 is provided behind the seat 3, there are provided connection support portions 54, 55 which comprise strikers 15 which are provided at the vehicle-body wall portion of the package tray 53 and lock brackets 16 which are provided at the side portion of the reinforcing structure body 9 and the central portion of the reinforcing structure body 29, for example.

The present should not be limited to the above-described embodiments, and any other modifications or improvements can be applied within the scope of a sprit of the present invention.

For example, instead of the above-described embodiments in which the connection support portions are comprised of the strikers 15 which are provided at the vehicle-body wall portion 4 of the vehicle side panel or the package tray 53 and the lock brackets 16 which are provided at the reinforcing structure bodies 9, 29, the connection support portions which connect the reinforcing structure bodies 9, 29 to the vehicle-body side member may be comprised of the strikers 15 which are provided at the reinforcing structure bodies 9, 29 and the lock brackets 16 which are provided at the vehicle-body wall portion 4 of the vehicle side panel or the package tray 53 to the contrary.

The number of passengers available for the seat 3 or the number of headrests 6a, 7a should not be limited to those described in the above-described embodiments, and any modifications are available. Further, the above-described armrest 7b provided at the seat for two passengers 7 may be omitted. In this case, the above-described middle frame 33 may be omitted, and the above-described pressure-receiving portion may be configured to extend over substantially the entire width of the seatback 7 in the vehicle width direction.

Moreover, without providing the above-described headrest moving-mechanism portions 11, 31, the move of the pressure-receiving portion may be detected electrically, and the headrest may be driven electrically to protect the passenger's head portion.

What is claimed is:

1. A seat system for a vehicle, comprising:
a first seat for a passenger, the first seat including a seatback to support a passenger's back portion and a headrest to support a passenger's head portion;
a first reinforcing structure body reinforcing the seatback of said first seat;
a connection support portion connecting said first reinforcing structure body to a vehicle-body wall portion so as to support the first reinforcing structure body at the vehicle-body wall portion;
a first pressure-receiving portion provided in the seatback of said first seat and supported so as to move rearwardly by being pressed by the passenger in a vehicle rear collision, the first pressure-receiving portion being arranged at a specified height position which is upwardly away from a lower end portion of the seatback of the first seat;
a first headrest moving-mechanism portion moving the headrest of said first seat forwardly or upwardly in accordance with a rearward move of the first pressure-receiving portion; and
a second seat for a passenger, the second seat including a seatback and a headrest,
wherein the seatback of the second seat comprises a second reinforcing structure body reinforcing the seatback of the second seat, a second pressure-receiving portion supported so as to move rearwardly by being pressed by the passenger seated in the second seat in a vehicle rear collision, the second pressure-receiving portion being arranged at a specified height position which is upwardly away from a lower end portion of the seatback of the second seat, and a second headrest moving-mechanism portion moving the headrest of the second seat forwardly or upwardly in accordance with a rearward move of the second pressure-receiving portion, and
a distance from the lower end portion of the seatback of said first seat to said first pressure-receiving portion of the first seat is set to be greater than a distance from the lower end portion of the seatback of said second seat to said second pressure-receiving portion of the second seat.

2. The seat system for a vehicle of claim 1, wherein a baggage room is formed in back of said first seat, and a bottom portion of the baggage room is provided so as to extend rearwardly from a position near the lower end portion of the first seat.

3. The seat system for a vehicle of claim 1, wherein at said first headrest moving-mechanism portion of the first seat is provided a connecting member which connects said first pressure-receiving portion and the headrest of said first seat, at said first reinforcing structure body of the first seat is provided a swing support portion which swingably supports said connecting member, and said headrest of the first seat moves forwardly or upwardly in accordance with a swing move of said connecting member around said swing support portion.

4. The seat system for a vehicle of claim 3, wherein said swing support portion is provided near said connection support portion.

5. The seat system for a vehicle of claim 4, wherein said first reinforcing structure body of the first seat is comprised of a seatback frame which extends along an outer periphery of the seatback of the first seat, and configured so that a lower portion thereof has a width which is narrower than that of an upper portion thereof in an elevation view, and said first headrest moving-mechanism portion of the first seat is arranged inside the first reinforcing structure body.

6. A seat system for a vehicle, comprising:
a first seat for a passenger, the first seat including a seatback to support a passenger's back portion and a headrest to support a passenger's head portion;
a first reinforcing structure body reinforcing the seatback of said first seat;
a connection support portion connecting said first reinforcing structure body to a vehicle-body wall portion so as to support the first reinforcing structure body at the vehicle-body wall portion;
a first pressure-receiving portion provided in the seatback of said first seat and supported so as to move rearwardly by being pressed by the passenger in a vehicle rear collision, the first pressure-receiving portion being arranged at a specified height position which is upwardly away from a lower end portion of the seatback of the first seat;
a first headrest moving-mechanism portion moving the headrest of said first seat forwardly or upwardly in accordance with a rearward move of the first pressure-receiving portion; and
a second seat for a passenger, the second seat including a seatback and a headrest,
wherein the seatback of said second seat comprises a second reinforcing structure body reinforcing the seatback of the second seat, a second pressure-receiving portion supported so as to move rearwardly by being pressed by the passenger seated in the second seat in a vehicle rear collision, the second pressure-receiving portion being arranged at a specified height position which is upwardly away from a lower end portion of the seatback of the second seat, and a second headrest moving-mechanism portion moving the headrest of the second seat forwardly or upwardly in accordance with a rearward move of the second pressure-receiving portion,
said second reinforcing structure body is disconnected from the vehicle-body wall portion so as not to be supported at the vehicle-body wall portion, and
a distance from the lower end portion of the seatback of said first seat to said first pressure-receiving portion of the first seat is set to be greater than a distance from the lower end portion of the seatback of said second seat to said second pressure-receiving portion of the second seat.

7. The seat system for a vehicle of claim 6, wherein a baggage room is formed in back of said first seat, and a bottom portion of the baggage room is provided so as to extend rearwardly from a position near the lower end portion of the first seat.

8. The seat system for a vehicle of claim 6, wherein at said first headrest moving-mechanism portion of the first seat is provided a connecting member which connects said first pressure-receiving portion and the headrest of said first seat, at said first reinforcing structure body of the first seat is provided a swing support portion which swingably supports said connecting member, and said headrest of the first seat moves forwardly or upwardly in accordance with a swing move of said connecting member around said swing support portion.

9. The seat system for a vehicle of claim 8, wherein said swing support portion is provided near said connection support portion.

10. The seat system for a vehicle of claim 9, wherein said first reinforcing structure body of the first seat is comprised of a seatback frame which extends along an outer periphery of the seatback of the first seat, and configured so that a lower portion thereof has a width which is narrower than that of an upper portion thereof in an elevation view, and said first headrest moving-mechanism portion of the first seat is arranged inside the first reinforcing structure body.

* * * * *